United States Patent [19]

Alten

[11] Patent Number: 4,800,604
[45] Date of Patent: Jan. 31, 1989

[54] BRIDGING DEVICE FOR DOCKS

[76] Inventor: Kurt Alten, Ringstr. 14, D-3015 Wennigsen, Fed. Rep. of Germany

[21] Appl. No.: 166,658

[22] Filed: Mar. 11, 1988

[30] Foreign Application Priority Data

Mar. 16, 1987 [DE] Fed. Rep. of Germany ....... 3708446

[51] Int. Cl.$^4$ ............................................. E01D 1/00
[52] U.S. Cl. ....................................... 14/71.3; 14/71.7
[58] Field of Search ............... 14/71.1, 71.3, 71.7, 14/69.5; 414/584

[56] References Cited

U.S. PATENT DOCUMENTS

| | | | |
|---|---|---|---|
| 2,881,457 | 4/1959 | Rodgers | 14/71.7 |
| 3,235,895 | 2/1966 | Wallace et al. | 14/71.7 |
| 4,382,307 | 5/1983 | Alten | 14/71.7 |

FOREIGN PATENT DOCUMENTS 3412068 3/1985 Fed. Rep. of Germany ...... 414/584

Primary Examiner—Jerome W. Massie
Assistant Examiner—Matthew Smith
Attorney, Agent, or Firm—Becker & Becker, Inc.

[57] ABSTRACT

A bridging device for docks. A lifting cylinder is provided for raising a bridge plate, in which is mounted an extension that can be retracted or extended via a feed cylinder. A hydraulic arrangement is associated with the bridging device, and includes a reversible pump. A relief valve that can be hydraulically closed is provided in the return line from the lifting cylinder. The actuating connection of this relief valve is connected to the feed lines for the feed cylinder.

4 Claims, 1 Drawing Sheet

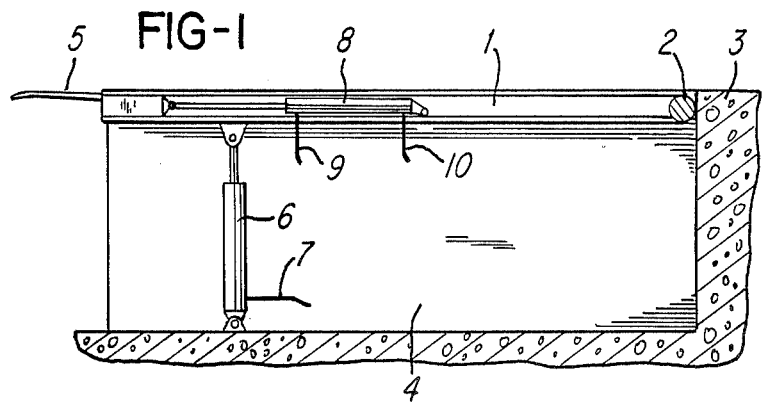
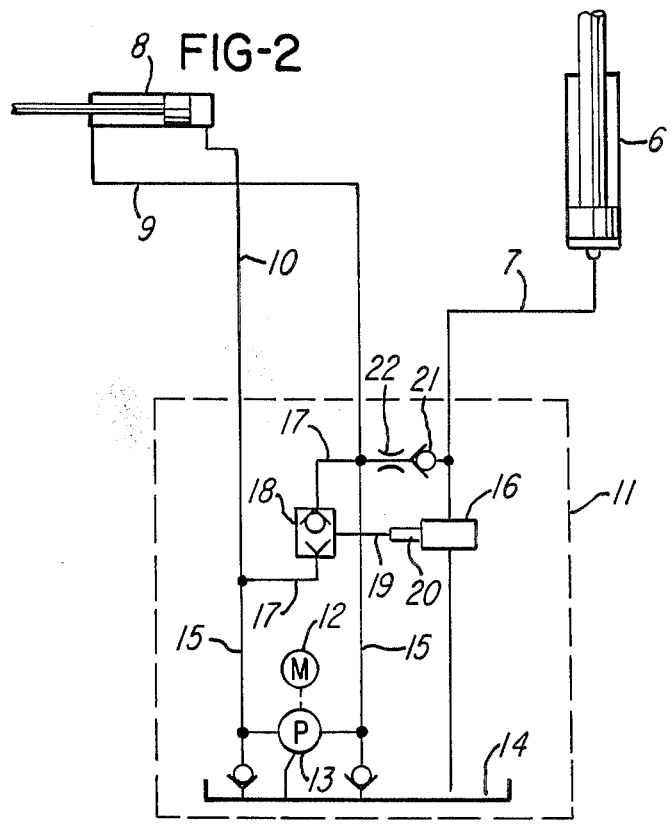

BRIDGING DEVICE FOR DOCKS

BACKGROUND OF THE INVENTION

The present invention relates to a dock leveler or bridging device that includes a bridge plate that is pivotably connected to a dock. The bridge plate can be raised via a lifting cylinder, and can be lowered by its own weight. The free end of the bridge plate is provided with a movable extension that can be retracted or extended via a feed cylinder for removal from or placement upon a platform that is to be loaded or unloaded.

With bridges of this type, the lifting cylinder for pivoting the bridge plate is provided with only a single pressure line that is disposed at the bottom. This line is pressurized when the bridge plate is to be raised. Lowering of the bridge plate is effected via the weight of the bridge plate itself, with the pressure medium being expelled from the lifting cylinder. With the heretofore known bridges, such a lowering movement requires special control and switching means.

It is an object of the present invention to provide a bridging device of the aforementioned general type where the control and switching means can be embodied in a particularly straightforward manner in cooperation with the two pressure lines of a reversible pump.

BRIEF DESCRIPTION OF THE DRAWING

This object, and other objects and advantages of the present invention, will appear more clearly from the following specification in conjunction with the accompanying schematic drawing, in which:

FIG. 1 is a vertical cross-sectional view through one exemplary embodiment of the inventive bridging device, with the extension in an extended position; and FIG. 2 illustrates an exemplary hydraulic circuitry for the bridging device of FIG. 1.

SUMMARY OF THE INVENTION

With the inventive bridging device, the return line from the lifting cylinder can be blocked by a relief valve, and the pump that serves to supply the lifting cylinder and the feed cylinder is reversible in such a way that in one direction of rotation it serves to shift the feed cylinder in one direction, while in the other direction of rotation the pump serves to shift the feed cylinder in the other direction; furthermore, the relief valve can be closed hydraulically, and its actuating connection is connected to the feed lines for the feed cylinder.

In this connection, the two feed lines for the feed cylinder are expediently connected via check valve means either directly or indirectly with the aforementioned actuating connection, so that when the pump operates in one direction the extension of the bridge plate is extended, and when the pump operates in the opposite direction the extension is retracted. In other words, via the control and pressurizing of the relief valve, the two feed lines for the feed cylinder can be hydraulically operated independently of one another.

Thus, the inventive configuration does away with the need for switching elements to activate the relief valve. In particular, the generally utilized solenoid valves are eliminated.

As a result of the present invention, it is furthermore possible, in one direction of rotation of the pump, to operate not only the feed cylinder but also the lifting cylinder. This is desirable in particular when the extension is retracted and the bridge plate must be raised. To accomplish this with the present invention, the appropriate feed line to the feed cylinder is supplied with full pressure, while the feed line to the lifting cylinder is provided with a restrictor or similar flow control device in such a way that the line that is branched off from the aforementioned feed line to the relief valve is similarly supplied with full pressure, so that a sufficiently great actuating pressure is provided for the relief valve.

Further specific features of the present invention will be described in detail subsequently.

DESCRIPTION OF PREFERRED EMBODIMENTS

Referring now to the drawing in detail, the dock leveler or bridging device includes a bridge plate 1 that is pivotably mounted via a horizontal shaft 2 to the ramp or dock 3. The bridge plate 1 is disposed in a dock recess 4 of corresponding size, and can be pivoted up out of or down into this recess. Disposed at the free end of the bridge plate 1 is an extension 5 that can be shifted in the direction of the bridge plate 1, and that can be placed upon a platform, for example of a truck, that is to be loaded or unloaded.

A lifting cylinder 6 having a feed line 7 is provided for raising the bridge plate 1. A feed cylinder 8 is used to shift the extension 5. The feed cylinder 8 has a feed line 9 for retracting the extension, and a feed line 10 for extending the extension. The feed lines 7, 9, and 10, which can, for example, be hydraulic supply lines, are connected to a hydraulic arrangement 11 that includes a pump 13, such as a gear-type pump, that can be driven by the electric motor 12. The pump 13 is reversible, and can convey fluid in both directions of rotation. Disposed below the pump 13 is a reservoir or sump 14 for the pressure oil.

The two possible compressed-fluid or pressure lines 15 of the pump 13 are connected to the feed lines 9, 10. Consequently, in one direction of rotation of the pump 13, the extension 5 can be extended, and in the other direction of rotation of the pump 13, the extension 5 can be retracted.

Lowering of the bridge plate 1 is effected by its own weight, with the oil in the lifting cylinder 6 being expelled and being returned to the sump 14 via the opened relief valve 16 and the feed line 7. The valve 16 is preferably embodied in such a way that it is continually open in order to permit a return flow.

The two feed lines 9, 10 are each operatively connected with the relief valve 16 via a tie line 17, a valve 18 that is in the form of a double check valve and is provided with three connections, and also a connecting line 19 that has a hydraulic actuating element 20, for example in the form of a cylinder. The feed lines 9, 10 are connected to the relief valve 16 in such a way that when one of the lines 9, 10 is pressurized, due to the presence of the valve 18 the hydraulic fluid cannot pass into the other feed line and be carried off thereby. The ball within the valve 18 has two seats, and can accordingly block one or the other of the tie lines 17 to prevent flow therein.

Such an embodiment always leads to actuation of the relief valve 16, and hence prevents the flow of fluid from or back to the lifting cylinder 6 when the extension 5 is either retracted or extended.

A connection is additionally provided between the feed line 9 and the feed line 7. This connection is provided with a check valve 21 that prevents fluid from flowing back from the feed line 7 to the feed line 9. The connecting line of this connection is also provided with a restrictor or similar flow control device 22 that, when the feed line 9 is pressurized for retracting the extension 5, effects pressurization of the feed line 7 as well, though to a reduced extent due to the restrictor 22. The pressure that builds up ahead of the restrictor 22 is used to activate the actuating element 20, and consequently to close the relief valve 16. Thus, in this way it is possible in one direction of rotation of the pump 13 to retract the extension 5 and at the same time raise the bridge plate 1 without having to have special control means for this purpose. This operating sequence can be used, for example, to take the bridge out of action. If the bridge plate 1 has assumed its highest position, and the extension 5 has been retracted, it is possible, for example by means of a limit switch, to return the bridge plate 1 to the starting position via its own weight.

It is to be understood that the inventive hydraulic arrangement has three very important operating sequences, namely: (a) lifting of the bridge plate and retraction of the extension, (b) extension of the extension, and (c) lowering of the bridge plate. All of these operating sequences are possible merely by changing the direction of rotation of the pump 13.

The present invention is, of course, in no way restricted to the specific disclosure of the specification and drawing, but also encompasses any modifications within the scope of the appended claims.

What I claim is:

1. A bridging device that includes a bridge plate that is pivotably connected to a dock; the bridge plate can be raised via a lifting cylinder, and can be lowered by its own weight, the free end of said bridge plate is provided with a movable extension that can be retracted or extended via a feed cylinder for removal from or placement upon a platform that is to be loaded or unloaded; said bridging device further comprises:

a first line leading to said lifting cylinder;
   a hydraulically operable relief valve disposed in said first line for closing off the latter;
   a second line leading to an extension-effecting side of said feed cylinder;
   a third line leading to a retraction-effecting side of said feed cylinder;
   connecting line means connecting said relief valve to said second and third lines; and
   a reversible pump that is connected to said first, second, and third lines, for supplying medium thereto, in such a way that in one direction of rotation of said pump, said second line, and hence said feed cylinder, are supplied with medium to effect extension of said extension, while in the other direction of rotation of said pump, said third line, and hence said feed cylinder, are supplied with medium to effect retraction of said extension.

2. A bridging device according to claim 1, which includes check means disposed in said connecting line means in such a way that when medium is supplied to one of said second and third lines, such medium cannot flow over to the other side of said third and second lines.

3. A bridging device according to claim 1, in which one of said second and third lines is operatively connected to said first line that leads to said lifting cylinder via the interposition of a flow control device.

4. A bridging device according to claim 3, in which said third line is connected to said first line via said flow control device.

* * * * *